UNITED STATES PATENT OFFICE 2,040,860

PRODUCTION OF ANTHRAPYRIMIDINES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application March 30, 1933, Serial No. 663,646. In Germany September 17, 1932

12 Claims. (Cl. 260—32)

The present invention relates to valuable new compounds of the anthrapyrimidine series and a process of producing compounds of the anthrapyrimidine series.

We have found that industrially valuable compounds of the anthrapyrimidine series, namely anthrapyrimidines and derivatives thereof are obtained by treating alpha-acylaminoanthraquinones of the general formula:

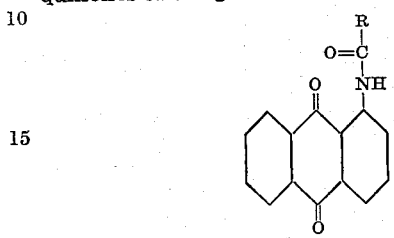

(in which R represents hydrogen or an organic radicle such as methyl, ethyl, propyl etc., phenyl, naphtyl, quinolyl, pyridyl, cyclohexyl and the radicles of anthraquinone, anthraquinoneacridone, anthraquinonethioxanthone, benzanthrone and the like; these radicles may be substituted by halogen, nitro, amino, hydroxy, alkoxy, alkyl groups and the like) or derivatives thereof in the presence of inert organic solvents or diluents with agents capable of reacting like a compound of the general formula:

$$R'-NH_2$$

(in which R' represents hydrogen, an alkyl, aralkyl or aryl group, which may also be substituted) or agents supplying the same, such as amides of monobasic acids (for example benzamide and acetamide) salts (such as ammonium chloride and carbonate) or double compounds (such as the double compound of ammonium chloride and zinc chloride). In the reaction water is split off. Water may be present in small amounts but the presence of great quantities thereof must be avoided. It is likely that amidines are formed intermediately in the reaction; for example the reaction in the case of alpha-acetylaminoanthraquinone and ammonia may proceed as follows:

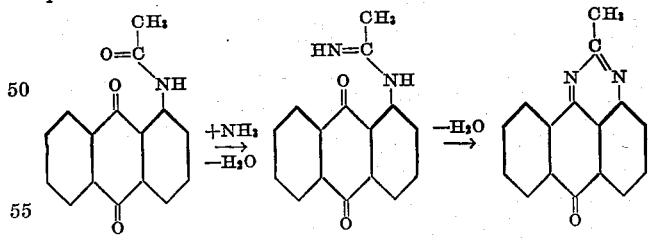

The products containing instead of the methyl group the radicles of vattable compounds are especially valuable. Initial materials containing a further group —NH—CO—R'' in the 4- or 5-position besides the group —NH—CO—R in 1-position and wherein R'' may be equal to or different from R can be used also. By varying the temperature, the pressure and the period of reaction only one or more of the said groups can be caused to react.

Suitable solvents or diluents are for example the phenols, nitrobenzene, halogenbenzenes, toluene, anisol, aniline, pyridine and quinoline. The preparation of the acyl compounds and their conversion into the anthrapyrimidines may be carried out in one operation if desired. In many cases it is advantageous to add substances which promote the reaction, as for example copper, copper compounds, oxides or salts of vanadium or tungsten. Moreover it is often preferable to carry the reaction out under pressure in order to shorten the time of reaction. Usually the reaction is effected at between 100 and 220° C., somewhat lower and higher temperatures may be used also, if desired.

The reaction products, usually obtained in a state of good purity and in good yields, may be purified or separated from isomers and byeproducts formed by known methods if desired, as for example by crystallization, sublimation, boiling with organic solvents or separation in the form of their salts with strong mineral acids. Especially uniform products are obtained by employing monoacylated alpha-aminoanthraquinones.

The following examples will further illustrate the nature of this invention but the invention is not restricted to these examples. The parts are by weight.

Example 1

Gaseous ammonia is supplied to a mixture of 100 parts of 1-acetylaminoanthraquinone and 200 parts of phenol in a stirring autoclave until a pressure of 5 atmospheres is attained. The whole is then heated at from 125° to 130° C. until a sample withdrawn can no longer be saponified with sulphuric acid. The whole is allowed to cool, the phenol is removed by dilution with caustic soda or by steam distillation, and the remainder filtered by suction. The reaction product is a yellow powder and corresponds in all its properties with C-methyl-1.9-anthrapyrimidine.

In an analogous manner, C-methyl-2-methyl- 1.9-anthrapyrimidine or C-methyl-5-methoxy-1.9-anthrapyrimidine may be obtained from 1-acetylamino-2-methylanthraquinone or 1-acetylamino-5-methoxy-1.9-anthraquinone.

Example 2

20 parts of 1-acetylamino-4-chloranthraquinone are suspended in 100 parts of phenol, 2.5 parts of ammonium vanadate are added, gaseous ammonia is pressed in until the pressure is 3 atmospheres and the whole heated at 150° C. for about 8 hours while stirring. After cooling the product is worked up in the usual manner. The 4-amino-C-methyl-1.9-anthrapyrimidine obtained is dissolved in concentrated sulphuric acid, the solution then being diluted to an acid concentration of 65 per cent by the addition of water. The reaction product thus separates in the form of its sulphate which is filtered off by suction and washed with a little 65 per cent sulphuric acid. The residue is taken up in hot water, to which a little ammonia has been added if necessary, filtered by suction, washed until neutral and dried. The 4-amino-C-methyl-1.9-anthrapyrimidine thus obtained in a very pure state forms yellow prisms, melts at 271° C. and dissolves in concentrated sulphuric acid giving an orange-red coloration.

In an analogous manner 1-acetylamino-4-aminoanthraquinone yields 4-amino-C-methyl-1.9-anthrapyrimidine. 5-amino-C-methyl-1.9-anthrapyrimidine may be obtained from 1-acetylamino-5-chloranthraquinone or 1-acetylamino-5-nitroanthraquinone or 1-acetylamino-5-aminoanthraquinone. 1-acetylamino-8-chloranthraquinone or 1-acetylamino-8-aminoanthraquinone yields 8-amino-C-methyl-1.9-anthrapyrimidine with ammonia.

Example 3

100 parts of 1-benzoylamino-5-aminoanthraquinone are suspended in 200 parts of phenol in an autoclave, 10 parts of ammonium vanadate are added and gaseous ammonia pressed in until the pressure is 8 atmospheres. The whole is then heated for about 8 hours at 150° C. and worked up in the usual manner after cooling. The reaction product obtained in a very good yield is 5-amino-C-phenyl-1.9-anthrapyrimidine. It dissolves in concentrated sulphuric acid giving an orange coloration and, by crystallization from organic solvents in which it dissolves with a green fluorescence, forms needles which melt at about 202° C. The purification may also be effected by way of the sulphate. Instead of ammonia acetamide or benzamide or ammonium chloride may be used with a similar effect.

4-amino-C-para-chlorphenyl-1.9-anthrapyrimidine is formed by treating 1-para-chlorbenzoylamino-4-aminoanthraquinone, or 1 para-chlorbenzoylamino-4-chloranthraquinone or 1-para-chlorbenzoylamino-4-nitroanthraquinone with ammonia in phenol at the boiling temperature of the mixture and 4 amino-C-quinolyl-1.9-anthrapyrimidine in a similar manner from 1-(quinoline-6'-carbamido)-4-aminoanthraquinone.

4-amino-C-phenyl-1.9-anthrapyrimidine is also obtained from 1-benzoylamino-4-aminoanthraquinone by heating with butylamine under pressure. 8-amino-C-phenyl-1.9-anthrapyrimidine is obtained in an analogous manner from 1-benzoylamino-8-aminoanthraquinone.

Example 4

20 parts of 1-formylamino-4-benzoylaminoanthraquinone are dissolved in 100 parts of phenol. After adding 2 parts of ammonium vanadate, the whole is heated to boiling for 24 hours while leading in ammonia. The whole is then allowed to cool, diluted with alcohol and the reaction product filtered off by suction. It is obtained in the form of yellow crystals which yield powerful green-yellow dyeings on cotton from a brown-violet vat. It crystallizes from organic solvents in needles and according to its properties is probably 4-benzoylamino-1.9-anthrapyrimidine.

An anthrapyrimidine derivative yielding yellow dyeings is obtained in an analogous manner from 1-acetylamino-4-benzoylaminoanthraquinone under the same reaction conditions. If, however, ammonia is pressed into the vessel up to a pressure of 8 atmospheres; and then the vessel is heated whereby the pressure rises up to between 30 and 40 atmospheres, C-methyl-C'-phenyl-1.9.4.10-anthrapyrimidine is obtained. 4-acetylamino-C-methyl-1.9-anthrapyrimidine is obtained from 1.4-diacetyldiaminoanthraquinone, 4-benzoylamino-C-phenyl-1.9-anthrapyrimidine from 1.4-dibenzoyldiaminoanthraquinone and 5-benzoylamino-C-phenyl-1.9-anthrapyrimidine from 1.5-dibenzoyldiaminoanthraquinone.

1.5-diformyldiaminoanthraquinone yields 5-formylamino-1.9-anthrapyrimidine by heating with ammonia in the presence of phenol.

4-para-toluenesulphamino-C-methyl-1.9-anthrapyrimidine is obtained from 1-acetylamino-4-para-toluenesulphaminoanthraquinone.

Example 5

100 parts of 1.4-dibenzoyldiaminoanthraquinone, 300 parts of phenol and 10 parts of ammonium vanadate are heated to boiling while stirring and leading in ammonia until a sample being worked up dyes cotton pure yellow shades and no longer red shades. Then the reaction mixture is allowed to cool and Py-C-phenyl-4-benzoylamino-1.9-anthrapyrimidine obtained in crystalline form in a very good yield is filtered off by suction. It dissolves in chlorbenzene giving a yellow coloration and a green fluorescence, in concentrated sulphuric acid giving an orange coloration and crystallizes in needles dyeing cotton from a dark violet vat yellow shades.

The same product may be obtained by treating with benzoylchloride, 4-amino-Py-C-phenyl-1.9-anthrapyrimidine (obtainable by treating 1-amino-4-benzoylaminoanthraquinone at between 170° and 180° C. in phenol with ammonia).

In an analogous manner different 1.4-diaroyl aminoanthraquinones may be converted into corresponding products; for example by starting with 1.4-di-para-chlorobenzoylaminoanthraquinone the corresponding chlorinated product is obtained.

From 1.5-diaroylaminoanthraquinones, Py-C-aryl-5-aroylamino-1.9-anthrapyrimidines may be prepared in a corresponding manner, for example the derivatives of the 8-amino-1.9-anthrapyrimidine series are obtained from 1.8-diaroylaminoanthraquinones.

Acetylamino-4-benzoylaminoanthraquinone yields a product dyeing cotton yellow shades.

The products described above may be purified, if desired, by means of oxidizing agents such as alkali metal hypochlorites.

Example 6

100 parts of 1-amino-5-acetylaminoanthraquinone (obtained by partial saponification of 1-para-toluenesulfamino-5-acetylamino-anthraquinone) and 250 parts of phenol are heated in a stirring autoclave for about 6 hours under a pressure of 8 atmospheres of ammonia at 150° C. After cooling the reaction mixture is diluted with 250 parts of methyl alcohol, the mass is filtered by suction and the filtering residue is washed with methyl alcohol. About 85 parts of a red-violet crystal powder is obtained which according to its properties is 5-amino-C-methyl-1.9-anthrapyrimidine. The crude product may be purified by way of its sulphate or by recrystallization. After recrystallization from trichlorobenzene the product is a crystal powder consisting of brown violet needles, dissolving in sulphuric acid giving a yellow coloration which changes into bluish green when formaldehyde is added; upon dilution with water a red-violet sulphate is precipitated from the sulphuric acid solution; the sulphate is hydrolyzable by great amounts of water; by the addition of alkali the amino compound is set free therefrom. The product dissolves in organic solvents giving a yellowish-red coloration.

From 1-amino-5-β-anthraquinonylamino-anthraquinone-5-amino-C-2′-anthraquinonyl-1.9-anthrapyrimidine can be prepared in a corresponding manner. This product is a red crystalline powder dissolving in concentrated sulphuric acid giving a yellow coloration changing into green upon the addition of formaldehyde.

Example 7

50 parts of the acylamine obtainable from 1.4-diaminoanthraquinone and 1-nitroanthraquinone-2-carboxylic acid chloride and 200 parts of phenol are introduced into an autoclave, ammonia is pressed into the same up to a pressure of 8 atmospheres and then the sealed vessel is heated to 150° C. while stirring for 15 hours. Then the mixture is allowed to cool, diluted with alcohol and the reaction product is filtered off by suction. It is a pink-red powder dissolving in concentrated sulphuric acid giving an orange coloration and yielding strong red dyeings of excellent fastness from a violet black vat. Probably the product is Py-C-1′-amino-2′-anthraquinonyl-Py′-C-1″-amino-2″-anthraquinonyl-1.9.4.10-anthradipyrimidine corresponding to the formula

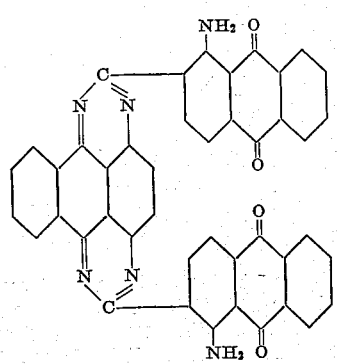

In a similar manner Py-C-phenyl-Py′-C-2′-anthraquinonyl-1.9.4.10-anthradipyrimidine corresponding to the formula

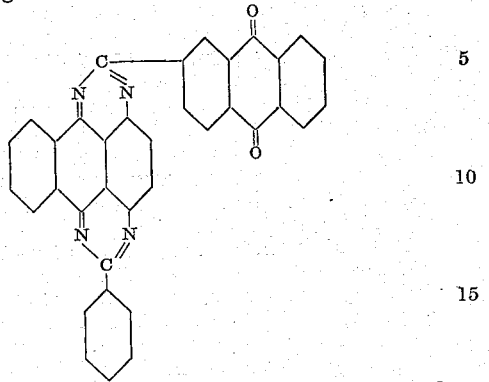

may be obtained from the acylamine derived from 4-amino-Py-C-phenyl-1.9-anthrapyrimidine and anthraquinone-2-carboxylic acid chloride.

Starting with such acylamines of the 1.4-anthraquinone series as contain other anthraquinone carboxylic acids as acyl components (for example 5-nitroanthraquinone-2-carboxylic acid, 1-chloranthraquinone-2-carboxylic acid, anthraquinone-1-carboxylic acid, higher molecular vattable carboxylic acids such as the carboxylic acid derived from anthraquinonethioxanthone, anthraquinoneacridone, anthraquinoneimidazol, thiazolanthrone, anthrapyrimidone, anthrapyridone and pyrazolanthrone) 1.9.4.10-anthradipyrimidines are obtained containing the radicles corresponding to the said carboxylic acids fixed to the carbon atoms of the two pyrimidine rings by means of —C—C— linkages. The radicles fixed to the two pyrimidine rings may be equal to or different from one another.

Depending on the substituents the products yield dyeings of different shades varying usually between yellow and red.

The products may be purified, if desired, according to usual methods, for example by sublimation, by treatment with oxidizing agents such as hypochlorites or by way of their salts.

Example 8

The acylamine is prepared from 1.5-diaminoanthraquinone and anthraquinone-2-carboxylic acid chloride. 50 parts thereof and 250 parts of phenol are heated to 150° in a stirring autoclave for from 10 to 15 hours after pressing in ammonia until the pressure amounts to between 6 and 8 atmospheres (at ordinary temperature). The reaction product is isolated in the usual manner; it is Py-C-2′-anthraquinonyl-Py′-C-2″-anthraquinonyl-1.9.5.10-anthradipyrimidine corresponding to the formula

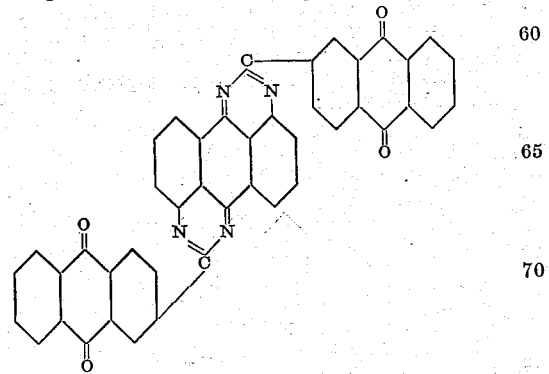

It is obtained in the form of a crystalline yellow powder dissolving in concentrated sulphuric acid giving an orange coloration, yielding a dark-green to black vat from which the vegetable fibre is dyed yellow shades of excellent fastness.

Using other acylamines of 1.5-diaminoanthraquinone or its derivatives (for example 1.5-diamino-8-hydroxy or 8-methoxy-anthraquinone combined with vattable carboxylic acids) 1.9.5.10-anthradipyrimidines are obtained which are substituted at the carbon atoms in the two pyrimidine rings by the radicles which were connected with the carboxylic group in the carboxylic acid used.

Py-C-2'-anthraquinonyl-Py'-C-Bz-3-anthraquinonebenzacridonoyl - 1.9.5.10-anthradipyrimidine is obtained by treating with ammonia in phenol the acylamine from 1-amino-5-β-carbaminoanthraquinone and anthraquinonebenz-acridone-Bz-3-carboxylic acid chloride.

The condensation may be effected with the similar effect in other diluents, for example chlorphenol, cresol, pyridine, quinoline or nitrobenzene.

What we claim is:—

1. Anthradipyrimidines corresponding to the formula:

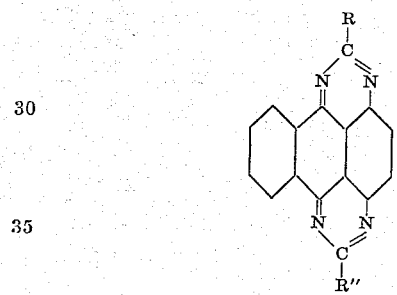

wherein R and R'' stand for hydrogen or an alkyl radicle or a radicle of the benzene, napthalene, pyridine, quinoline or anthraquinone series, at least one of the groups R and R'' being a vattable aromatic radicle.

2. Anthradipyrimidines corresponding to the formula:

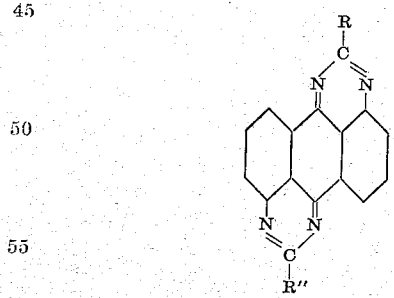

wherein R and R'' stand for hydrogen or an alkyl radicle or a radicle of the benzene, naphthalene, pyridine, quinoline or anthraquinone series, at least one of the groups R and R'' being a vattable aromatic radicle.

3. Anthradipyrimidines corresponding to the general formula:

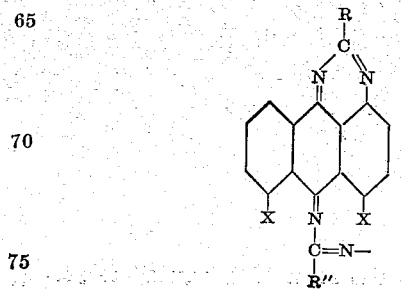

wherein the free linkage of the one nitrogen atom is attached in one of the positions marked X to the nucleus shown, and wherein R and R'' stand for hydrogen, an alkyl radicle or a radicle of the benzene, naphthalene, pyridine, quinoline or anthraquinone series, at least one of the groups R and R'' being a vattable aromatic radicle.

4. A process of producing compounds of the anthrapyrimidine series which comprises heating with ammonia an alpha-acylamino-anthraquinone corresponding to the general formula:

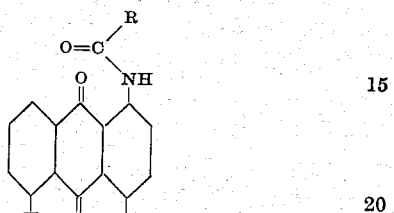

(wherein R stands for hydrogen, an alkyl radicle or a radicle of the benzene, naphthalene, pyridine, quinoline or anthraquinone series, and one X for —NHR'', wherein R'' stands for hydrogen or —CO.R, the other X being hydrogen) in an inert organic diluent in the absence of large amounts of water.

5. A process of producing compounds of the anthrapyrimidine series which comprises heating with ammonia an alpha-acylamino-anthraquinone corresponding to the general formula:

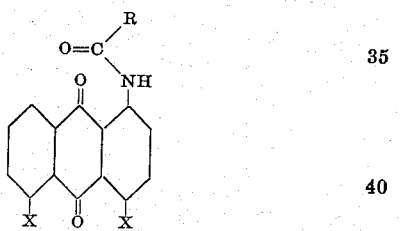

(wherein R stands for hydrogen, an alkyl radicle or a radicle of the benzene, naphthalene, pyridine, quinoline or anthraquinone series; and one X for NHR'', wherein R'' stands for hydrogen or —CO.R, the other X being hydrogen, at least one of the radicles R being a vattable aromatic group) in an inert organic diluent in the absence of large amounts of water.

6. A process of producing compounds of the anthrapyrimidine series which comprises heating with ammonia an alpha-acylamino-anthraquinone corresponding to the general formula:

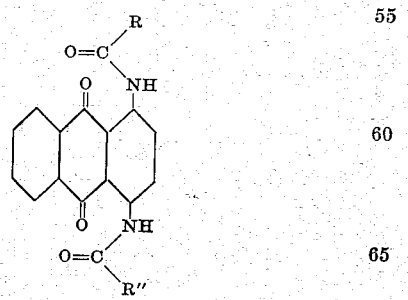

(wherein R and R'' stand for hydrogen or an alkyl radicle or a radicle of the benzene, naphthalene, pyridine, quinoline or anthraquinone series, at least one of the radicles R and R'' being a vattable aromatic group) in an inert organic diluent in the absence of large amounts of water.

7. A process of producing compounds of the anthrapyrimidine series which comprises heating with ammonia an alpha-acylamino-anthraquinone corresponding to the general formula:

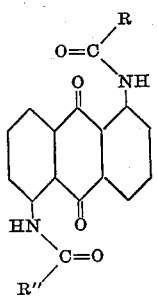

(wherein R and R'' stand for hydrogen or an alkyl radicle or a radicle of the benzene, naphthalene, pyridine, quinoline or anthraquinone series, at least one of the radicles R and R'' being a vattable aromatic group) in an inert organic diluent in the absence of large amounts of water.

8. A process of producing compounds of the anthrapyrimidine series which comprises heating with ammonia an alpha-acylamino-anthraquinone corresponding to the general formula:

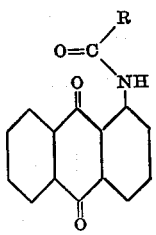

(wherein R stands for hydrogen or an alkyl radicle or a radicle of the benzene, naphthalene, pyridine, quinoline or anthraquinone series) in an inert organic diluent in the absence of large amounts of water.

9. A process of producing compounds of the anthrapyrimidine series which comprises heating with ammonia an alpha-acylamino-anthraquinone corresponding to the general formula:

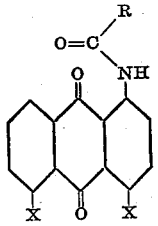

(wherein R stands for hydrogen, an alkyl radicle or a radicle of the benzene, naphthalene, pyridine, quinoline or anthraquinone series, and one X for —NHR'', wherein R'' stands for hydrogen or —CO.R, the other X being hydrogen) in an inert organic diluent with a salt capable of supplying ammonia.

10. A process of producing compounds of the anthrapyrimidine series which comprises heating with ammonia an alpha-acylamino-anthraquinone corresponding to the general formula:

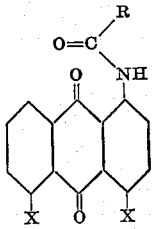

(wherein R stands for hydrogen, an alkyl radicle or a radicle of the benzene, naphthalene, pyridine, quinoline or anthraquinone series, and one X for —NHR'', wherein R'' stands for hydrogen or —CO.R, the other X being hydrogen) at a temperature between 100° and 220° C. in an inert organic diluent in the absence of large amounts of water.

11. A process of producing compounds of the anthrapyrimidine series which comprises heating under superatmospheric pressure with ammonia an alpha-acylamino-anthraquinone corresponding to the general formula:

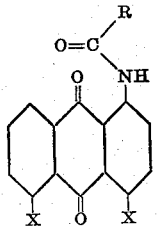

(wherein R stands for hydrogen, an alkyl radicle or a radicle of the benzene, naphthalene, pyridine, quinoline or anthraquinone series and one X for —NHR'', wherein R'' stands for hydrogen or —CO.R, the other X being hydrogen) in an inert organic diluent.

12. A process of producing compounds of the anthrapyrimidine series which comprises heating with ammonia an alpha-acylamino-anthraquinone corresponding to the general formula:

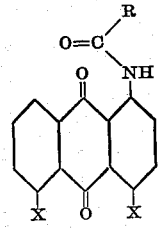

(wherein R stands for hydrogen, an alkyl radicle or a radicle of the benzene, naphthalene, pyridine, quinoline or anthraquinone series, and one X for —NHR'', wherein R'' stands for hydrogen or —CO.R, the other X being hydrogen) in phenol.

MAX ALBERT KUNZ.
KARL KOEBERLE.